United States Patent
Dick et al.

(10) Patent No.: US 11,162,421 B2
(45) Date of Patent: Nov. 2, 2021

(54) BEARING CAVITY AND METHOD OF EVACUATING OIL THEREFROM

(71) Applicant: PRATT & WHITNEY CANADA CORP., Longueuil (CA)

(72) Inventors: Jean-Sébastien Dick, Saint-Lambert (CA); Daniel Alecu, Brampton (CA); Kenneth Parkman, Georgetown (CA)

(73) Assignee: PRATT & WHITNEY CANADA CORP.

(*) Notice: Subject to any disclaimer, the term of this patent is extended or adjusted under 35 U.S.C. 154(b) by 0 days.

(21) Appl. No.: 16/660,247

(22) Filed: Oct. 22, 2019

(65) Prior Publication Data

US 2021/0115851 A1    Apr. 22, 2021

(51) Int. Cl.
F02C 7/06 (2006.01)
F01D 25/18 (2006.01)
F16C 33/66 (2006.01)

(52) U.S. Cl.
CPC ............... *F02C 7/06* (2013.01); *F01D 25/18* (2013.01); *F16C 33/6685* (2013.01); *F05D 2220/32* (2013.01); *F05D 2240/50* (2013.01); *F05D 2250/191* (2013.01); *F05D 2260/609* (2013.01)

(58) Field of Classification Search
CPC .... F01D 25/16; F01D 25/18; F05D 2260/602; F05D 2260/609; F16N 31/02; F16C 33/1025; F16C 33/103; F16C 33/6685
See application file for complete search history.

(56) References Cited

U.S. PATENT DOCUMENTS

| | | | |
|---|---|---|---|
| 2,848,284 A | 8/1958 | Atkinson et al. | |
| 3,614,257 A | 10/1971 | Campbell | |
| 3,773,396 A | 11/1973 | Easley | |
| 4,095,857 A | 6/1978 | Palmer | |
| 4,741,630 A * | 5/1988 | Oeynhausen | F01D 11/00 384/144 |
| 5,106,209 A | 4/1992 | Atkinson et al. | |
| 5,261,751 A * | 11/1993 | Heinz | F16C 33/6685 384/466 |
| 6,996,968 B2 * | 2/2006 | Peters | F01D 25/18 60/39.08 |
| 6,997,618 B2 | 2/2006 | Delano | |
| 7,373,780 B2 | 5/2008 | Peters et al. | |
| 7,387,445 B2 | 6/2008 | Swainson | |
| 7,430,850 B2 | 10/2008 | Peters et al. | |
| 7,625,126 B2 | 12/2009 | Peters et al. | |
| 7,699,530 B2 | 4/2010 | Blais | |

(Continued)

FOREIGN PATENT DOCUMENTS

CA  2713802 C  7/2014
CN  202418235 U  9/2012

(Continued)

*Primary Examiner* — Igor Kershteyn
*Assistant Examiner* — Topaz L. Elliott
(74) *Attorney, Agent, or Firm* — Norton Rose Fulbright Canada LLP (57) ABSTRACT

The bearing chamber assembly can have a bearing chamber wall extending annularly and having a drain aperture, the drain aperture connecting a scavenge line, and a baffle, the baffle having an apertured sheet connected at one end to the bearing chamber wall, extending from the connected end over and past the scavenge port to a free edge, the free edge spaced from the bearing chamber wall.

20 Claims, 9 Drawing Sheets

(56) References Cited

U.S. PATENT DOCUMENTS

| | | |
|---|---|---|
| 7,753,172 B2 | 7/2010 | Munson |
| 7,789,200 B2 * | 9/2010 | Munson ................... F01D 25/20 |
| | | 184/1.5 |
| 7,811,001 B2 | 10/2010 | Swainson |
| 7,867,310 B2 | 1/2011 | Baten |
| 7,878,303 B2 | 2/2011 | Munson |
| 8,167,091 B2 * | 5/2012 | Alecu ..................... F01D 25/18 |
| | | 184/6.11 |
| 8,210,316 B2 * | 7/2012 | DiBenedetto ........... F01D 9/065 |
| | | 184/6.11 |
| 8,235,176 B2 | 8/2012 | Hannaford et al. |
| 8,398,363 B2 | 3/2013 | Mundinger et al. |
| 8,499,893 B2 | 8/2013 | Alecu et al. |
| 8,727,628 B2 | 5/2014 | Glahn et al. |
| 8,752,673 B2 * | 6/2014 | Thivierge ................. F16N 7/40 |
| | | 184/6.11 |
| 8,992,090 B1 | 3/2015 | Mills |
| 9,121,305 B2 | 9/2015 | Nicholson |
| 9,404,381 B2 * | 8/2016 | NguyenLoc .......... F16H 57/045 |
| 9,617,916 B2 | 4/2017 | Légaré et al. |
| 9,850,779 B2 | 12/2017 | Gatto et al. |
| 9,896,968 B2 | 2/2018 | Dibenedetto et al. |
| 9,976,444 B2 | 5/2018 | NguyenLoc et al. |
| 10,041,410 B2 | 8/2018 | Beier |
| 10,047,649 B2 | 8/2018 | Lucas |
| 10,247,020 B2 | 4/2019 | McCune |
| 10,247,036 B2 | 4/2019 | Do et al. |
| 10,253,692 B2 | 4/2019 | Burghardt |
| 10,287,915 B2 | 5/2019 | McCune |
| 10,329,954 B2 | 6/2019 | Race et al. |
| 10,364,880 B2 | 7/2019 | Anglin et al. |
| 10,751,656 B2 * | 8/2020 | Klaus ...................... F02C 7/06 |
| 2005/0132710 A1 * | 6/2005 | Peters ..................... F01D 25/18 |
| | | 60/772 |
| 2006/0002645 A1 * | 1/2006 | Swainson ............... F16C 33/10 |
| | | 384/462 |
| 2008/0110813 A1 * | 5/2008 | Munson .................. F01D 25/20 |
| | | 210/167.04 |
| 2008/0134657 A1 * | 6/2008 | DiBenedetto ........... F02K 3/068 |
| | | 60/39.08 |
| 2011/0048856 A1 * | 3/2011 | Thivierge ............. F16H 57/0406 |
| | | 184/6.11 |
| 2014/0064930 A1 * | 3/2014 | NguyenLoc ............ F01D 25/24 |
| | | 415/122.1 |
| 2014/0144121 A1 | 5/2014 | Légaré et al. |
| 2017/0314417 A1 * | 11/2017 | Van Den Berg .... F16C 33/6685 |
| 2017/0328236 A1 | 11/2017 | Shinohara et al. |
| 2018/0079516 A1 * | 3/2018 | Phan ....................... B64D 27/24 |
| 2018/0280851 A1 * | 10/2018 | Klaus ..................... B01D 45/14 |
| 2018/0334960 A1 | 11/2018 | Harral et al. |
| 2019/0085972 A1 | 3/2019 | Uhkoetter et al. |
| 2019/0101025 A1 * | 4/2019 | Felde ..................... F01D 25/166 |

FOREIGN PATENT DOCUMENTS

| | | | |
|---|---|---|---|
| CN | 102227547 B | 10/2014 | |
| CN | 204628296 U | 9/2015 | |
| CN | 207975251 U | 10/2018 | |
| CN | 106837553 B | 2/2019 | |
| CN | 106662150 B | 3/2019 | |
| EP | 0527052 B1 | 12/1995 | |
| EP | 1612437 B1 | 12/2006 | |
| EP | 1890013 B1 | 5/2015 | |
| EP | 2107218 B1 | 10/2015 | |
| EP | 2880281 B1 | 6/2018 | |
| EP | 2975227 B1 | 10/2018 | |
| JP | 1296829 B2 | 7/2009 | |
| JP | 5074855 B2 | 11/2012 | |
| JP | 5450646 B2 | 3/2014 | |
| JP | 5375149 B2 | 8/2018 | |
| WO | WO-2016129014 A1 * | 8/2016 | ............. F16N 31/00 |
| WO | WO-2020245529 A1 * | 12/2020 | ............. F01D 25/18 |

* cited by examiner

BEARING CAVITY AND METHOD OF EVACUATING OIL THEREFROM

TECHNICAL FIELD

The application related generally to aircraft engines and, more particularly, to a method and system to evacuate oil from a bearing cavity thereof.

BACKGROUND OF THE ART

Gas turbine engines have rotors held in engine casings via bearings. The bearings are continuously supplied with oil and the oil is continually recycled by containing it in bearing cavities, scavenging it from the bearing cavities, processing it (air-oil separation, filtering), and returning it to the bearings. The rotors can rotate at thousands of RPM, entraining a circumferential flow of air and oil in the bearing cavities. Centrifugal acceleration tends to move the oil radially outwardly leading to an oil film formation on the bearing cavity wall, which can be evacuated via the scavenge line. Known techniques were satisfactory to a certain extent, but there always remains room for improvement.

SUMMARY

In one aspect, there is provided a bearing chamber assembly for an aircraft engine, the bearing chamber assembly comprising a bearing chamber wall extending annularly and having a drain aperture, the drain aperture connecting a scavenge line, and a baffle, the baffle having an apertured sheet connected at one end to the bearing chamber wall, extending from the connected end over and past the scavenge port to a free edge, the free edge spaced from the bearing chamber wall.

In another aspect, there is provided a method of operating a gas turbine engine, the method comprising rotating a rotor within a casing of the gas turbine engine via bearings, supplying the bearings with oil, capturing the oil exiting the bearings in a bearing cavity, the rotation of the rotor entraining a standing circumferential flow of air with oil droplets in the bearing cavity, collecting oil droplets carried by the air along a baffle generally extending circumferentially and axially over and around a scavenge port, collected oil droplets being pushed along a radially-inner surface of the baffle, reaching apertures in the baffle, moving across the apertures and into the scavenge port.

In a further aspect, there is provided a gas turbine engine comprising in serial flow configuration a compressor, a combustor, and a turbine, the compressor and turbine having rotating components mounted on at least one rotor, said rotor being rotatably held in the gas turbine engine via at least one bearing housed in a bearing chamber, an oil delivery system including an oil recirculation loop to send oil to the bearing, to be captured in the bearing chamber and guided into a scavenge line across a scavenge port; and a baffle, the baffle having an apertured sheet connected at one end to the bearing chamber, extending from the connected end over and past the scavenge port to a free edge, the free edge spaced from the bearing chamber wall.

DESCRIPTION OF THE DRAWINGS

Reference is now made to the accompanying figures in which.

DETAILED DESCRIPTION

Figure 1:
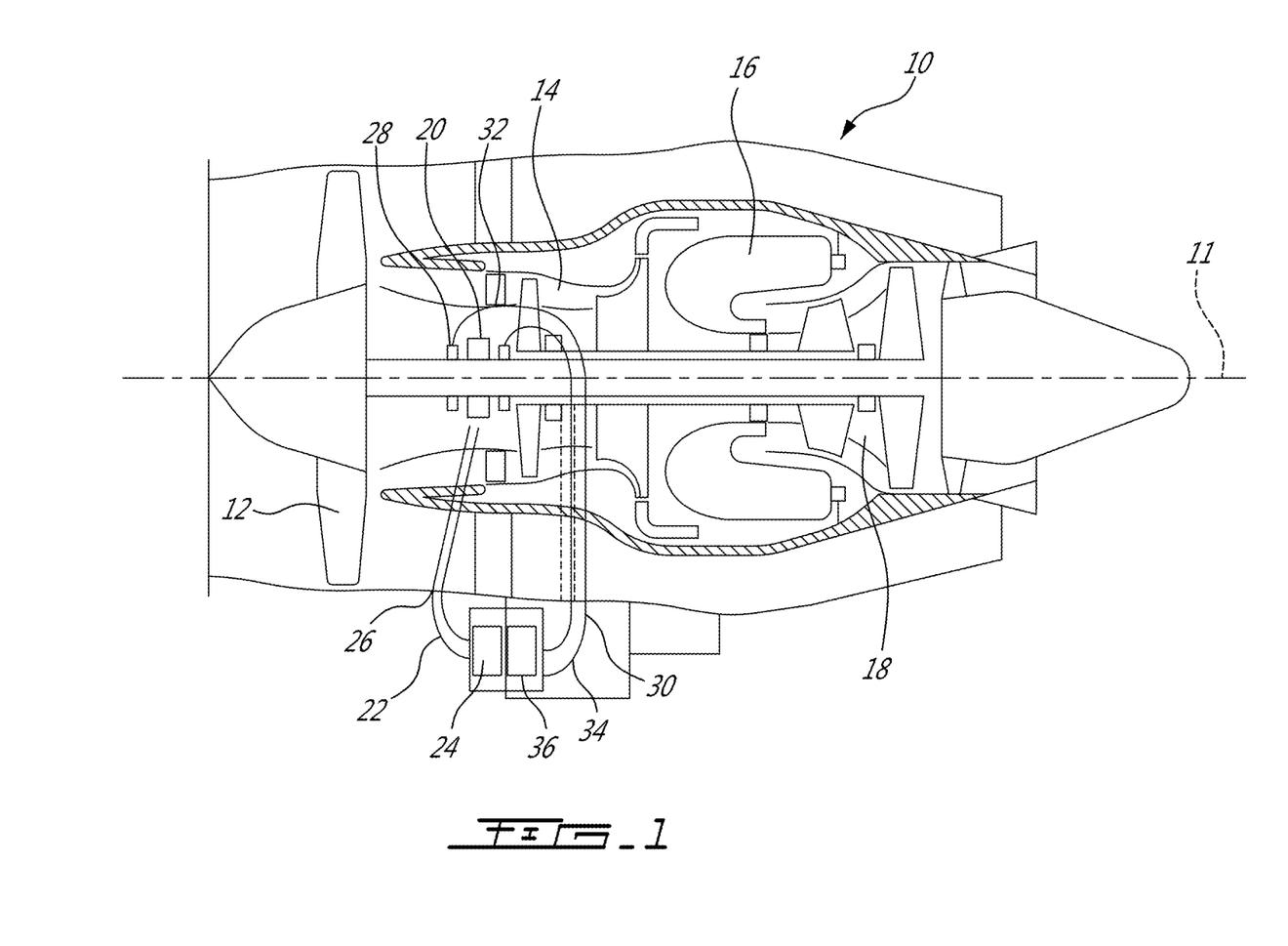
FIG. 1 is a schematic longitudinal cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases, with rotary components rotating around a main axis 11.

The compressor 14, fan 12 and turbine 18 have rotating components which can be mounted on one or more shafts, forming rotors. Bearings 20 are used to provide smooth relative rotation between the shaft(s) and engine casing (non-rotating component), and/or between two shafts which rotate at different speeds. An oil lubrication system 22 including an oil pump 24, sometimes referred to as a main pump, and a network of conduits and nozzles 26, can be provided to feed the bearings 20 with oil. The oil is contained in bearing cavities, typically formed inside annular bearing chambers 32 axially terminated by seals 28, with a pressure difference directing a flow of air leakage into the bearing cavity, across the seals 28. A scavenge system 30 having one or more scavenge lines 34, extending from the bearing chamber 32, and one or more scavenge pumps 36, is used to recover the oil, which can be in the form of an oil foam at that stage. Air/oil separation and filtering is typically provided for before returning the processed oil to the bearings 20.

Figure 2A:
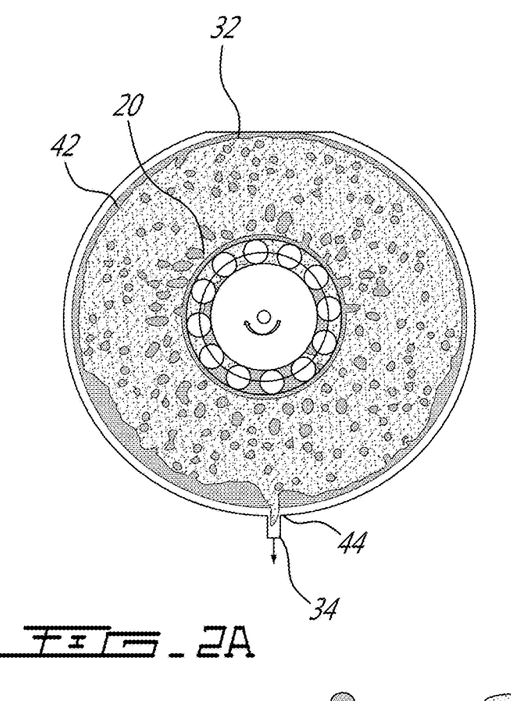
FIGS. 2A and 2B are transversal and longitudinal cross-sectional views, respectively, of a bearing chamber assembly.
Figure 2B:
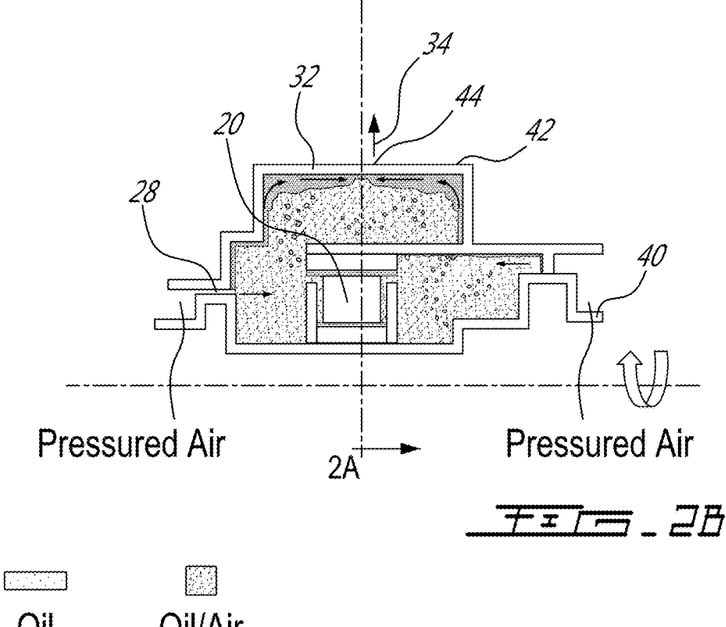
Figure 3:
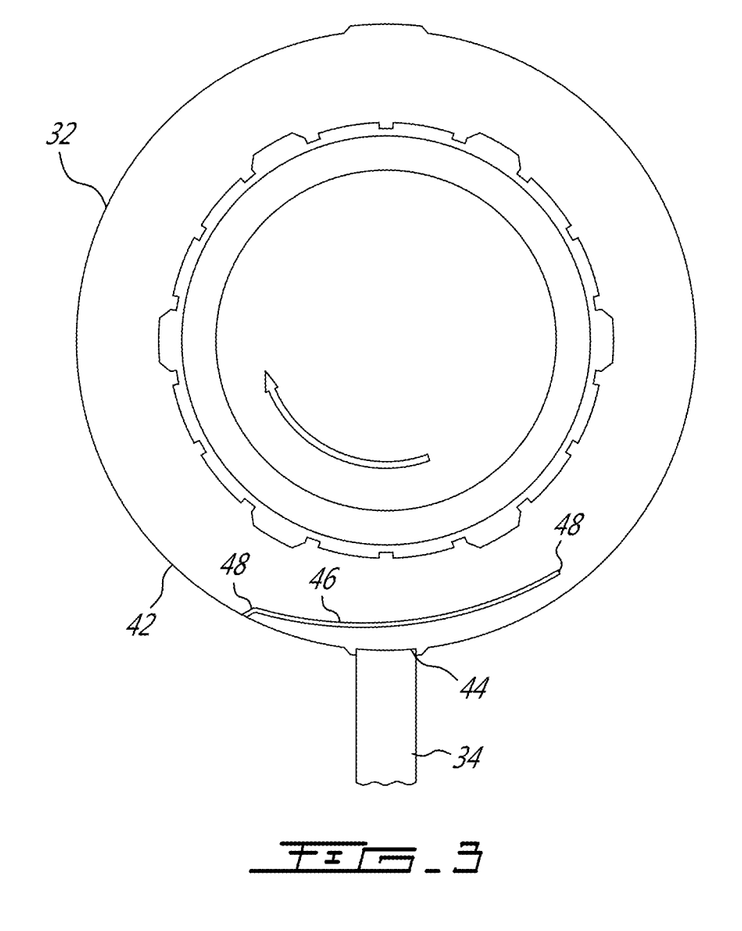
FIG. 3 is a transversal cross-sectional view of a bearing chamber assembly, in accordance with an embodiment.

An example of a bearing chamber 32 is presented in FIGS. 2A and 2B, where oil flow is also schematized based on the legend at the bottom of the sheet. During use, the rotor 40 can rotate at thousands of RPM, and its frictional engagement with the air/oil mixture, and the viscosity of the air/oil mixture, entrains a circumferential, rotational flow of air and oil in the bearing cavity. Centrifugal acceleration and pressure difference tends to entrain oil droplets having a substantial size radially outwardly, towards the bearing chamber's annular wall 42, where an oil film can form and flow circumferentially until it reaches the scavenge aperture 44, from where it is drained into the scavenge line 34. However, finer oil mist which can be more prevalent at higher RPM's for instance, may not be efficiently affected by the centrifugal and pressure difference effects, and if oil mist is created at a rate higher than the rate at which it is evacuated, it can tend to accumulate in the bearing cavity, which is undesired. FIG. 3 presents an embodiment of a bearing chamber 32 where this undesired phenomenon is addressed via a baffle 46 which is secured to (mechanically connected to) the bearing cavity wall 42 and extends over the scavenge aperture 44. It will be understood that although fluidic inertia caused by the rotation of the rotor may govern the circulation of the fluid when the engine is operating at thousands of RPM, it can be desired to allow oil to drain even when the engines are no longer operating. To this latter end, the scavenge aperture 44 can be positioned at a bottom of the bearing chamber wall, the expression "bottom" being understood herein to refer to a lowermost point of the bearing cavity when the aircraft is landed and rests on horizontal ground.

Especially when addressing oil evacuation issues in engines operating at higher RPM's (e.g. over 20 000 RPM and particularly in the range of 25 000 and 35 000 RPM), the design of such a baffle 46 can require careful attention. Indeed, while it can be desired for the baffle 46 to cause accumulation of mist into droplets, while also generally guiding (or at least not impeding flow of) liquid oil to drain, adding physical obstructions within the air/oil circulation path may cause undesired effects. In particular, aerodynamic steps created by such a baffle could break the air stream and explode existing droplets into mist, defeating the intended purpose, or the presence of a physical element in the air/oil circulation path may cause a pressure rise or stress on the seals for instance, or choke the flow, any of which may be undesired.

The baffle 46 design illustrated in FIG. 3 can reduce the oil residence volume (mist) inside the bearing chamber 32 such as by reducing the air entrainment from the rotating shaft 40 and by directing the oil towards the oil scavenge line 34. The air entrained by the rotation of the shaft 40 spreads the oil on the wall 42 of the chamber 32. The oil film is driven by the interfacial shear forces between the air and the oil (FIG. 2). The centrifugal forces can be so important at high rotation speeds that removing the oil from the bearing chamber 32 can become a challenge without the use of a mechanical component to redirect the flow towards the scavenge line 34.

In this specification, the expression bearing chamber assembly will be used to include the bearing chamber's wall/compartment and the baffle. As shown in FIG. 3, and perhaps more clearly in FIGS. 4 and 5, the baffle 46 can be made of an apertured sheet connected at one end 48, or edge, to the bearing chamber wall 42, extending from the connected end 48 over and past the scavenge port 44 to a free edge or end 50. The free edge 50 can be spaced from the bearing chamber wall 42 in a manner to allow the oil film circulating along the annular bearing chamber wall 42 to pass unobstructed into the spacing formed between the free edge 50 and the wall 42, and reach the scavenge port in a unhindered manner.

Figure 4:
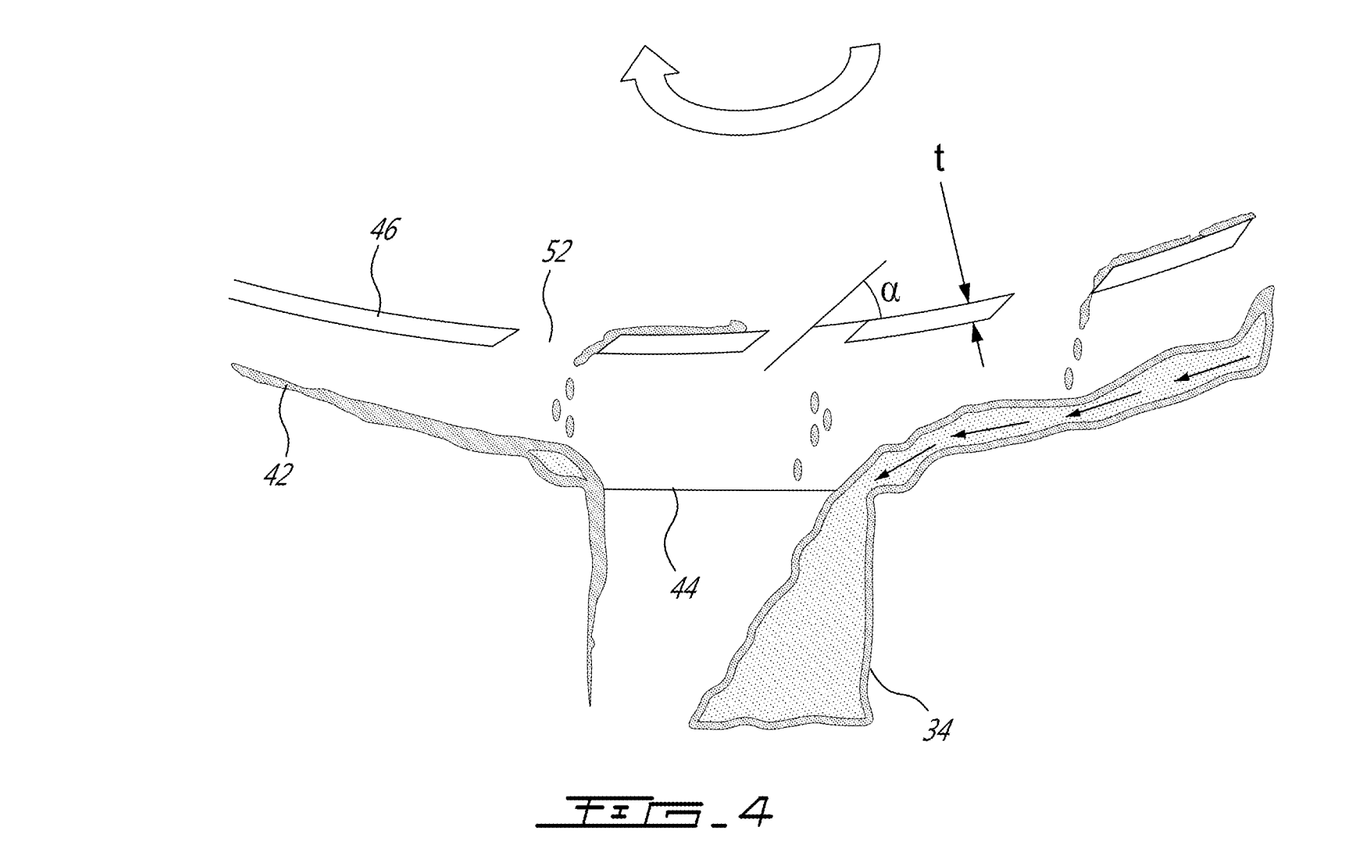
FIG. 4 shows a portion of FIG. 3 enlarged, schematizing liquid oil flow.

As perhaps best shown in FIG. 4, during operation, the baffle 46 can act as an oil collector by capturing the oil mixed to the tangential/circumferential air flow, and collecting the oil mist into oil droplets. The oil droplets can move across the apertures 52 in the baffle 46 and be evacuated through the scavenge port 34. The baffle 46 can redirect the air/oil mixture towards the scavenge port 34 while protecting the oil film's flow on the radially-outer wall 42 of the bearing chamber 32. With the baffle 46 extending past the scavenge port 44 on both circumferential sides, the pressure difference at the scavenge port 44 can draw air flow across the apertures 52, entraining the oil droplets to the scavenge port 44. The shape and configuration of the baffle 46 relative to the geometry of the bearing chamber 32 can allow to achieve the latter functions while limiting the likelihood of hydraulic jumps downstream of the baffle 46, since the oil is generally redirected under the baffle 46. The baffle 46 can be arranged in a stealthy, aerodynamic manner, to avoid generation of flow separation in the bearing chamber and limiting the generation of turbulence into the flow. The baffle 46 can be strategically located to reduce the interfacial shear at the oil film interface when it is about to enter the scavenge port while keeping a reasonable clearance from the scavenge port 44. The baffle 46 can axially extend across the entire axial width W of the bearing chamber.

The extent to which the baffle extends circumferentially to one side or the other of the scavenge port can vary depending on the specific application. Instead of having a curved portion at end 48 to connect roughly perpendicular to the wall, it can be configured to smoothly connect the wall 42, extend adjacent to it, to optimize the aerodynamics at the trailing edge. This latter configuration may lead to creation of a pocket under the baffle 46 where oil might stay in recirculation, which may, or may not, be considered acceptable depending on the application. The extent to which the free edge of the baffle extends past the scavenge port can be limited to avoid affecting oil accretion on the wall, which could cause a loss of the benefits of protecting the oil film that flows towards the scavenge. The baffle can cover a sector between 30 and 90 degrees of the cavity's perimeter, for instance, and possibly between 35 and 50 degrees of the cavity's perimeter, The specific design features of the baffle 46 as considered in one example application will now be described in greater detail.

Figure 5:
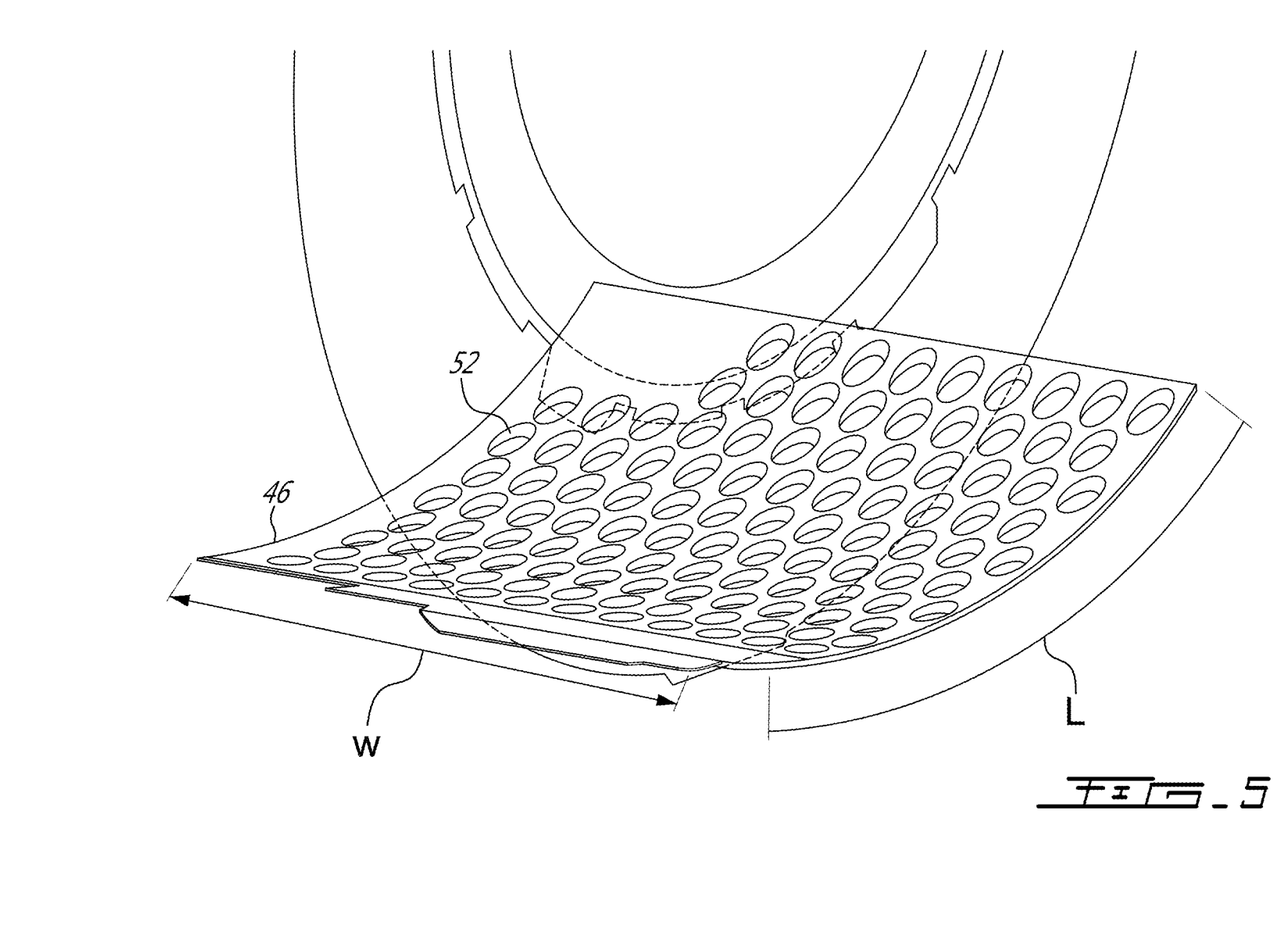
FIG. 5 is an oblique view showing an apertured baffle of the bearing chamber assembly of FIG. 3.

Firstly, as perhaps seen more easily on FIG. 5, the apertures 52 can be configured into a staggered array of apertures, in which the apertures of each axially-extending row of apertures are transversally offset relative to the apertures of the next axially-extending row of apertures, along the circumference of the bearing chamber 32, or otherwise said, along the length L of the baffle 46. This can allow apertures 52 to be present all along the axial width of the baffle's sheet body in a manner that as liquid oil travels circumferentially along the length of the baffle, if it passes between two adjacent apertures of a first row, it will then encounter an aperture of a subsequent row.

Secondly, as perhaps best shown in FIGS. 4 and 3, the apertures 52 can be louvered, i.e. defined obliquely and having an orientation forming an angle α with the surface of the baffle 46, in a manner to slope radially outwardly towards the connected end 48 of the baffle, downstream of the scavenge port 44. All the apertures 52 of the array can be identical to facilitate design and manufacturing, for instance. The baffle 46 can be made of a sheet of metal machined and formed, and the connected end 48 can be welded to the chamber wall 42 on the downstream side of the scavenge port 44. A curved portion can extend between the chamber wall 42 and the main, apertured, unconnected sheet body portion of the baffle. The apertured portion of the baffle 46 can be spaced apart from the chamber's wall 42 along which it extends, while remaining generally in the radially-outer portion of the bearing cavity. The relative position between the baffle 46 and the chamber wall 42 portion surrounding the scavenge port can vary depending on the application. The distance can be selected as a function of the expected oil film thickness, and the likelihood of choking the flow. Oil mist chokes at a lower velocity than dry air. As a result, one can prefer to increase substantially the distance from a dry air choking prediction. If smaller holes are being used, more space between the baffle and the wall may be needed to avoid the choking effect. In this specific embodiment, the connected end 48 of the baffle 46 is provided with a radially-outward curved portion which spaces the downstream end of the apertured portion of the baffle 46 from the bearing chamber wall 42, and the baffle 46 is provided with a radius having between 1.2 and 1.5 times the radius of the bearing chamber wall along which it extends/to which it is superposed, leading to a varying distance between the baffle apertured sheet body and the bearing chamber wall 42 along the circumferential orientation. More specifically, this varying radial distance can broaden in the circumferential region of the scavenge port 44, and become thinner in both circumferential orientations.

The baffle 46, with its staggered apertures 52, can help capture droplets which are entrained by the high velocity air currents inside the chamber 32. The angle α(FIG. 4) between the surface of the baffle and the axis of each aperture can be selected such that it reduces the risk of the oil detaching from the baffle 46 before it slides down the baffle 46. Oil can separate at the edge of a metal part when the potential energy of contact required to keep the oil attached to the metal is exceeded. As a result the oil that goes over the baffle 46 can be directed to the scavenge line 34 as well.

Figure 6A:
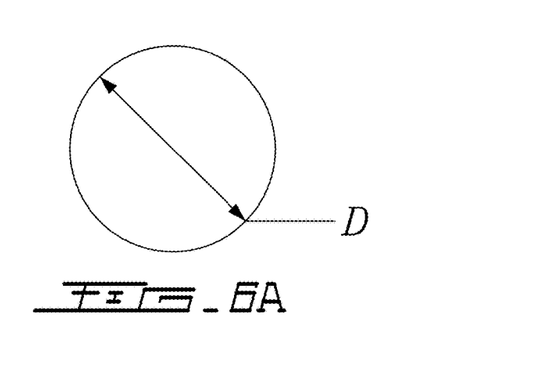
FIGS. 6A and 6B show two possible cross-sectional shapes for the apertures of the baffle.
Figure 6B:
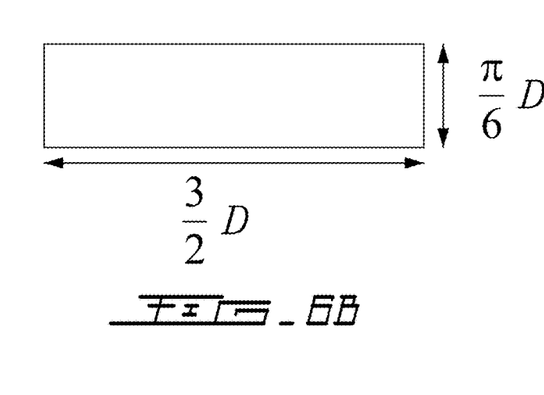
Figure 7A:
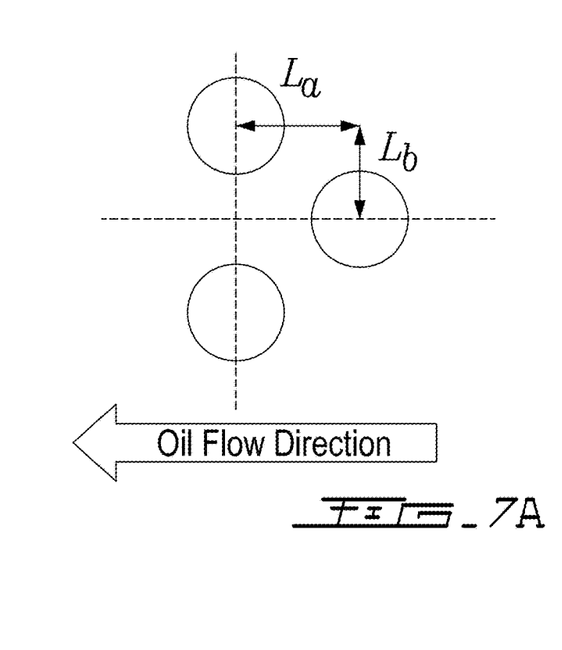
FIGS. 7A and 7B show two possible staggered array configurations for corresponding example cross-sectional shapes of the baffle.
Figure 7B:
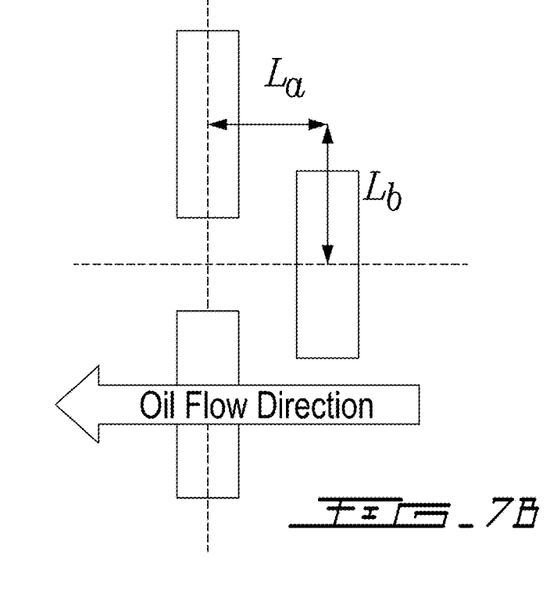

In the example application, the design features of the baffle itself can be as presented in the following table, where dimension D can be defined as shown in FIG. 6A for round holes, and as shown in FIG. 6B of rectangular holes, the staggered configuration can be as presented in FIGS. 7A and 7B relative to the oil flow direction shown by dark arrow.

TABLE 1 example design variants in one example aero engine application

| Feature | Possible Dimension or design ranges in example application |
| --- | --- |
| Metal sheet thickness (t) (inches) | $25 \times 10^{-3}$ in and $50 \times 10^{-3}$ in |
| Hole Size (D) (inches) | $3/32 \leq D \leq 3/16$ |
| Covered Area (φ)(%) | $40 \leq \phi \leq 60$ |
| Angle (α) | $30° < \alpha < 50°$ |
| Staggered pattern dimensions, circular openings | $5/4D \leq L_a \leq 2D$ and $3/4D \leq L_b \leq 5/4D$ |
| Staggered pattern dimensions, rectangular openings | $(\pi/6 + 1)D \leq L_a \leq 2D$ and $7/4D \leq L_b \leq 9/4D$ |

The manufacturing of the louvered baffle can be made quite simple. It can be made from a stamped sheet of metal or using laser hole drilling for instance. The sheet can be bent to have a main apertured portion match a radius between 1.2 and 1.5 times superior to the bearing cavity's outer wall radius. A curved portion in the connecting end can be formed at the same time by press-forming, for instance. The louvered baffle can be welded at the bottom of the cavity.

Figures 8A, 8B, 8C:
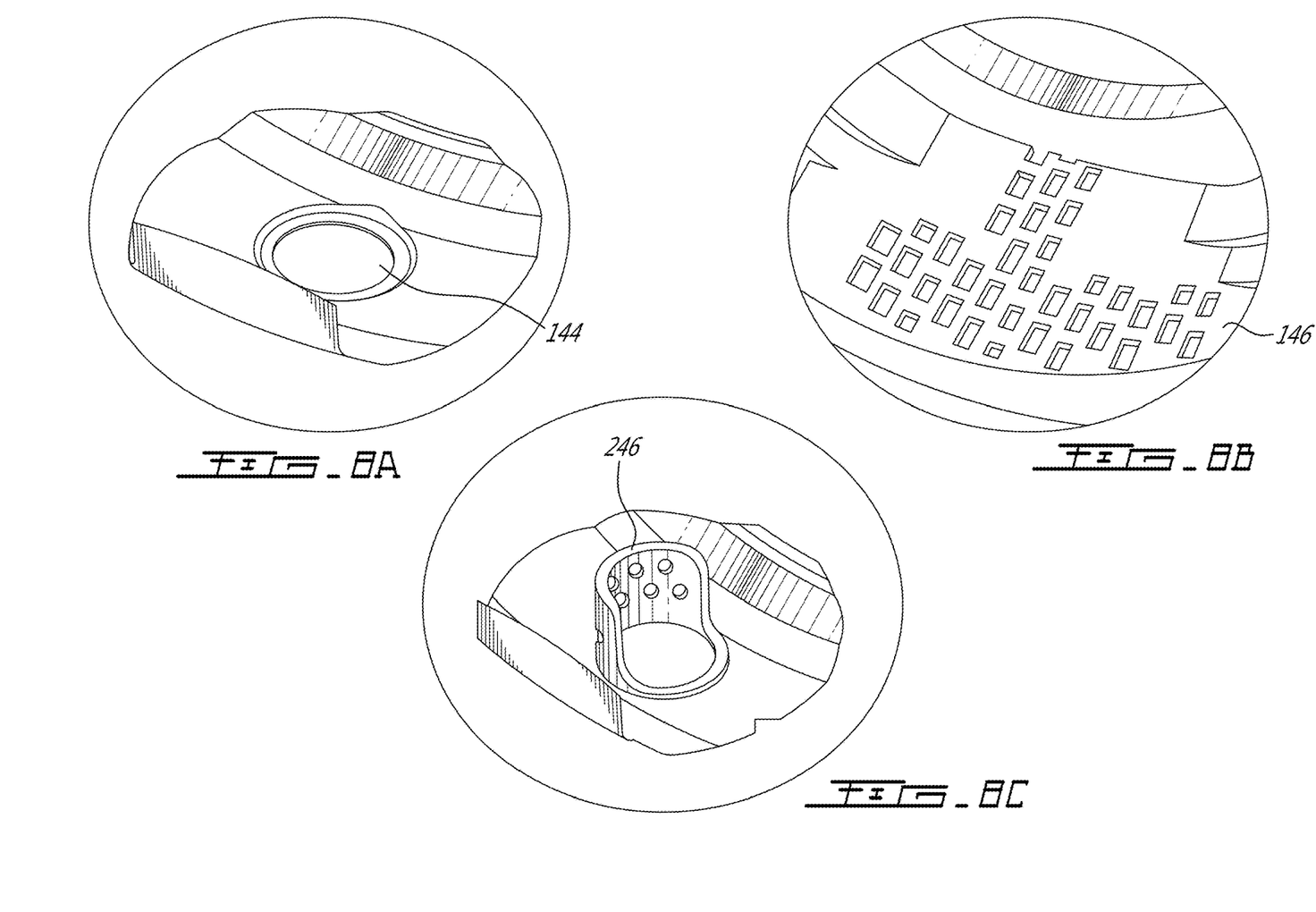
FIGS. 8A and 8B are oblique views showing the bearing chamber assembly without and with the baffle, respectively.
FIG. 8C is an oblique view of an alternate embodiment of a bearing chamber assembly.

FIG. 8A shows an example portion of bearing chamber wall, for a specific embodiment, generally annularly shaped, smooth in the circumferential orientation, and having a number of steps at corresponding radial depths in the axial orientation. The scavenge port 144 is provided at the widest and deepest one of the radial steps. FIG. 8B shows the same bearing chamber wall of FIG. 8A, but now presented in combination with a baffle having a staggered array of rectangular apertures.

FIG. 8C shows a variant of FIG. 8B, where the bearing chamber has the same geometry, but where instead of a baffle 146 extending circumferentially over and overlapping the scavenge port 144, a baffle 246 is provided which extends radially inwardly from a downstream side of the scavenge port.

Figure 9A:
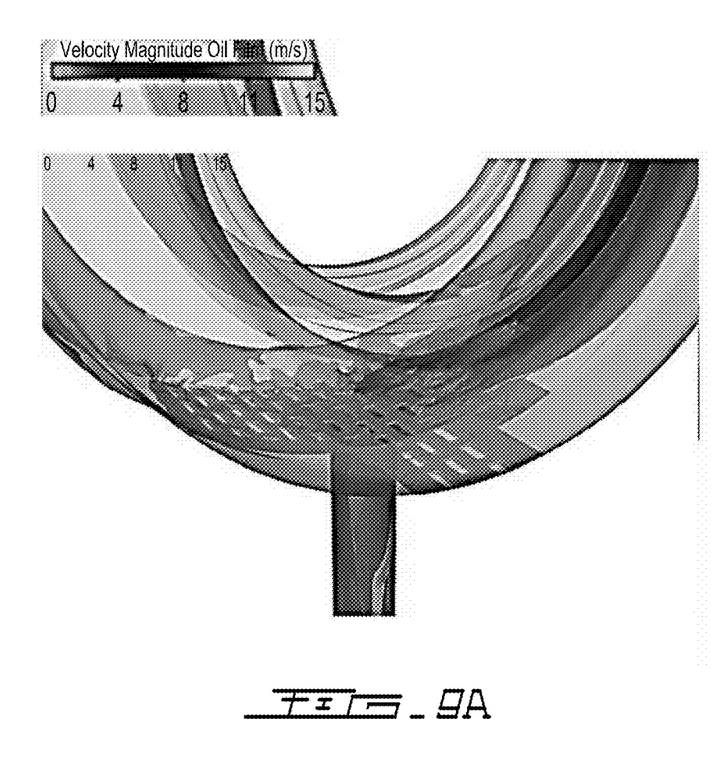
FIGS. 9A and 9B are oblique views illustrating the results of CFD simulations on bearing chamber geometries in accordance with FIGS. 8B and 8C, respectively.
Figure 9B:
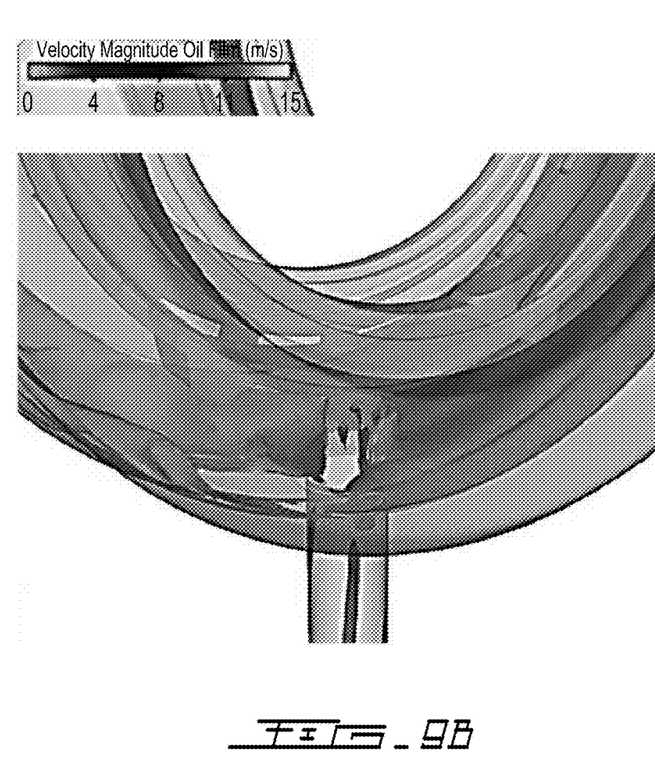

A case study based on CFD was performed, the results of which are presented in FIGS. 9A and 9B, comparing the design with radial baffle (design of FIG. 8C, results shown in FIG. 9B) with the circumferential baffle design shown in FIG. 8B (results shown in FIG. 9A). In this simulation, the circumferential baffle design reduced the oil residence volume by 51% at Take-Off and 10% at Ground-Idle when compared to the radial baffle design. A diminution of oil residence volume can lead directly to a reduction of heat generation by windage and can diminish the risks of oil leakage through the seals at sub-idle conditions.

Figure 10:
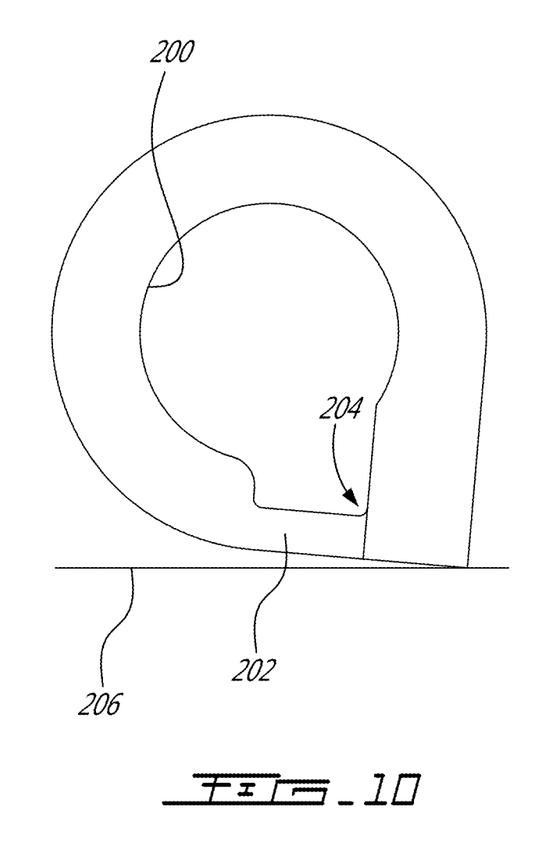
FIG. 10 is an alternate example of a bearing chamber.

The above description is meant to be exemplary only, and one skilled in the art will recognize that changes may be made to the embodiments described without departing from the scope of the invention disclosed. For example, the baffle approach described herein can be applied to engines other than turbofan gas turbine aircraft engines. The bearing chamber geometry can significantly vary from one embodiment to another, and while the bearing chamber wall will typically be "annular", or surface-of-revolution in shape, some portions of the bearing chamber wall can depart from such a theoretical "annular" shape. For instance, as shown in FIG. 10, a bearing chamber wall 200 can be considered "annular" in the context of this specification even though a drainage portion 202 of it is recessed into a partial rectangular prism shape, with the drain aperture 204 also being provided, in this example, at a bottom of the bearing chamber wall (line 206 represents here the horizontal orientation when the aircraft is landed and rests on horizontal ground). Still other modifications which fall within the scope of the present invention will be apparent to those skilled in the art, in light of a review of this disclosure, and such modifications are intended to fall within the appended claims.

The invention claimed is:

1. A bearing chamber assembly for an aircraft engine, the bearing chamber assembly comprising a bearing chamber wall extending annularly and having a drain orifice at a bottom of the bearing chamber wall, the drain orifice connecting a scavenge line, and a baffle, the baffle having an apertured sheet and extending along a circumferential direction relative to an axis of the bearing chamber wall from a first circumferential edge to a second circumferential edge, the first circumferential edge connected downstream of the drain orifice to the bearing chamber wall, the baffle extending from the first circumferential edge in an upstream direction, over and past the drain orifice to the second circumferential edge being a free edge, the free edge spaced from the bearing chamber wall.

2. The bearing chamber assembly of claim 1 wherein apertures of the apertured sheet are arrayed along a surface of the apertured sheet.

3. The bearing chamber assembly of claim 2 wherein the apertures are configured in a staggered array of identical apertures along the surface of the apertured sheet.

4. The bearing chamber assembly of claim 3 wherein bearing chamber wall defines the axis and an axial direction relative to the axis, and wherein an axial distance between apertures of a given row is of between 3/2 and 5/2 times a diameter of the apertures, and a circumferential distance between the apertures of successive rows is of between 5/4 and 2 times the diameter of the apertures.

5. The bearing chamber assembly of claim 3 wherein the bearing chamber wall has a radial direction and a circumferential direction relative to the axis, and wherein the apertures are rectangular, have an axially-oriented length of between 0.14 and 0.28 in, a circumferentially oriented width of between 5 and 10 in, an axial distance relative to the axis between apertures of a given row is of between 33 and 84 in, a circumferential distance between the apertures of successive rows is of between 14 and 38 in.

6. The bearing chamber assembly of claim 1 wherein the bearing chamber wall defines the axis and a radial direction relative to the axis, and wherein apertures of the apertured sheet slope radially outwardly towards the first circumferential edge.

7. The bearing chamber assembly of claim 6 wherein the apertures slope at an angle of between 30° and 50° relative to a surface of the apertured sheet.

8. The bearing chamber assembly of claim 1 wherein the apertured sheet is curved around an axis parallel to the axis of the bearing chamber wall, around a sheet radius of curvature between 1.2 and 1.5 times a bearing chamber wall radius of curvature.

9. The bearing chamber assembly of claim 1 wherein the first circumferential edge of the apertured sheet is welded to the bearing chamber wall.

10. The bearing chamber assembly of claim 1 wherein the apertured sheet has a thickness between $25\times10^{-3}$ in and $50\times10^{-3}$ in.

11. The bearing chamber assembly of claim 1 wherein apertures of the apertured sheet have a diameter between 3/32" and 3/16".

12. A method of operating a gas turbine engine, the method comprising rotating a rotor within a casing of the gas turbine engine via bearings, supplying the bearings with oil, capturing the oil exiting the bearings in a bearing cavity, the rotation of the rotor entraining a standing circumferential flow of air with oil droplets in the bearing cavity, collecting oil droplets carried by the air along a baffle generally extending along a circumferential direction relative to an axis of the bearing cavity from a first circumferential edge to a second circumferential edge, the first circumferential edge connected downstream of a scavenge port to a bearing chamber wall, the baffle extending from the first circumferential edge circumferentially and axially upstream, over and around the scavenge port to the second circumferential edge being spaced apart from the bearing chamber wall, collected oil droplets being pushed along a radially-inner surface of the baffle, reaching apertures in the baffle, moving across the apertures and into the scavenge port.

13. The method of claim 12 wherein the collected oil droplets move along a sloping internal face of the apertures, towards a downstream side of the bearing cavity, until they reach a sharp edge, and drop from the baffle towards the bearing chamber wall of the bearing cavity.

14. The method of claim 12 further comprising limiting a velocity of the air with oil droplets in a region between the baffle and the scavenge port.

15. The method of claim 12 wherein said rotating the rotor is performed at over 20 000 RPM.

16. The method of claim 15 wherein said rotating the rotor is performed at over 25 000 RPM.

17. A gas turbine engine comprising in serial flow configuration a compressor, a combustor, and a turbine, the compressor and turbine having rotating components mounted on at least one rotor, said rotor being rotatably held in the gas turbine engine via at least one bearing housed in a bearing chamber, an oil delivery system including an oil recirculation loop to send oil to the bearing, to be captured in the bearing chamber and guided into a scavenge line across a scavenge port, the scavenge port at a bottom of the bearing chamber; and a baffle, the baffle having an apertured sheet extending along a circumferential direction relative to an axis of a bearing chamber wall from a first circumferential edge to a second circumferential edge, the first circumferential edge connected to the bearing chamber downstream of the scavenge port, the apertured sheet extending from the first circumferential edge in an upstream direction, over and past the scavenge port to the second circumferential edge being a free edge, the free edge spaced from the bearing chamber wall.

18. The gas turbine engine of claim 17 wherein the apertures are configured in a staggered array of identical apertures along a surface of the apertured sheet.

19. The gas turbine engine of claim 17 wherein the apertures slope radially outwardly towards the first circumferential edge.

20. The gas turbine engine of claim 17 wherein the bearing chamber wall is generally annular, and wherein the apertured sheet is curved around an axis parallel to the axis of the bearing chamber wall, around a sheet radius of curvature between 1.2 and 1.5 times a bearing chamber wall radius of curvature.

* * * * *